(12) United States Patent
Yang

(10) Patent No.: US 12,092,918 B2
(45) Date of Patent: Sep. 17, 2024

(54) REFLECTIVE DISPLAY DEVICE WITH COLOR GENERATING LAYER HAVING OPTICAL GRATING PATTERNS

(71) Applicant: WUHAN CHINA STAR OPTOELECTRONICS TECHNOLOGY CO., LTD., Wuhan (CN)

(72) Inventor: Chaoqun Yang, Wuhan (CN)

( * ) Notice: Subject to any disclaimer, the term of this patent is extended or adjusted under 35 U.S.C. 154(b) by 0 days.

(21) Appl. No.: 17/298,611

(22) PCT Filed: Apr. 30, 2021

(86) PCT No.: PCT/CN2021/091645
§ 371 (c)(1),
(2) Date: Oct. 27, 2022

(87) PCT Pub. No.: WO2022/222189
PCT Pub. Date: Oct. 27, 2022

(65) Prior Publication Data
US 2024/0012283 A1    Jan. 11, 2024

(30) Foreign Application Priority Data
Apr. 23, 2021    (CN) .......................... 202110443171.1

(51) Int. Cl.
*G02F 1/1335*    (2006.01)
*G02F 1/1343*    (2006.01)

(52) U.S. Cl.
CPC .... *G02F 1/133526* (2013.01); *G02F 1/13439* (2013.01); *G02F 2203/02* (2013.01)

(58) Field of Classification Search
None
See application file for complete search history.

(56) References Cited

U.S. PATENT DOCUMENTS

| | | | |
|---|---|---|---|
| 2010/0091224 A1* | 4/2010 | Cho | G02B 5/201 359/589 |
| 2012/0013647 A1* | 1/2012 | Fang | G02B 6/0068 362/613 |
| 2016/0147080 A1* | 5/2016 | Son | G02B 5/008 427/163.1 |
| 2018/0083070 A1* | 3/2018 | Zhang | H10K 59/12 |
| 2018/0190673 A1* | 7/2018 | Wang | G02B 5/1866 |

(Continued)

FOREIGN PATENT DOCUMENTS

| | | |
|---|---|---|
| CN | 104076554 A | 10/2014 |
| CN | 106773256 A | 5/2017 |
| CN | 106990465 A | 7/2017 |

(Continued)

*Primary Examiner* — Ryan Crockett

(57) ABSTRACT

A reflective display panel is provided, wherein a color-generating layer of the reflective display panel includes optical grating patterns on reflective electrodes, and the optical grating patterns are configured to control a passage of light of different wavelengths. A nano-imprint technology is utilized to form the optical grating patterns with different shapes, heights, widths, period lengths, and space ratios to achieve control a passage of light of different wavelengths, so that the color-generating layer generates different monochromatic light, and light emitted by each sub-color-generating layer is brighter and has purer color.

19 Claims, 2 Drawing Sheets

(56) References Cited

U.S. PATENT DOCUMENTS

2020/0168741 A1\* 5/2020 Liu ..................... H10K 71/80

FOREIGN PATENT DOCUMENTS

| CN | 209198821 U | | 8/2019 |
|---|---|---|---|
| CN | 111752042 A | | 10/2020 |
| CN | 112014993 A | \* | 12/2020 |
| CN | 112596311 | \* | 4/2021 |
| CN | 112596311 A | | 4/2021 |
| JP | H11271516 A | | 10/1999 |
| JP | 2014123103 A | | 7/2014 |

\* cited by examiner

REFLECTIVE DISPLAY DEVICE WITH COLOR GENERATING LAYER HAVING OPTICAL GRATING PATTERNS

FIELD OF INVENTION

This application relates to a field of display technology, and in particular to a reflective display panel.

BACKGROUND OF INVENTION

With mobile devices and wearable applications becoming popular, demands for lightweight, thin, and power-saving display devices are also increasing. Therefore, development of energy-saving display devices becomes more and more important. Traditional liquid crystal display panels and organic light-emitting diode (OLED) display panels have lower external quantum efficiency or slow spectral response times, high power consumption, and greater input energy loss. In particular, liquid crystal display panels have only 30% transmittance due to their own color filter film properties, resulting in a final transmittance of the liquid crystal display panels being less than 10%, wherein most light is lost and power consumption is extremely high.

For this reason, development of reflective displays that utilize ambient light has gradually attracted attention of major panel manufacturers and scientific researchers. Ambient light in a reflective liquid crystal display panel in the prior art passes through a color filter layer and a liquid crystal layer to reach a reflective electrode. Then, the reflective electrode reflects light, and a reflected light passes through the liquid crystal layer and the color filter layer again and is emitted from an upper substrate surface to realize a picture display. In another type of reflective liquid crystal display panels, ambient light passes through a liquid crystal layer to reach a color filter layer, and then the color filter layer selectively absorbs and reflects the light, and a reflected light passes through the liquid crystal layer again and is emitted from an upper substrate surface to realize a picture display.

In summary, current reflective displays mainly utilize reflective color photoresist or color photoresist with reflective film layer to achieve colorization. Because the color photoresist itself has a high light absorption rate, ambient light needs to pass through the liquid crystal layer and the color photoresist twice, a loss rate of the ambient light is still very high, brightness of the display screen of the liquid crystal display panel needs to be improved, and its brightness is very low. Secondly, after adding reflective particles to increase reflectivity, its color saturation cannot be guaranteed. Furthermore, development of reflective color photoresist is relatively difficult. Its color saturation, contrast, and brightness are all poor and need to be improved.

Technical Problem

The present application provides a reflective display panel, which can solve technical problems of poor color saturation, poor contrast, and low brightness of current reflective displays which utilize reflective color photoresists or color photoresists with reflective film layers to achieve colorization. Because the color photoresist itself has a high light absorption rate, ambient light needs to pass through a liquid crystal layer and a color photoresist twice. A loss of ambient light is high, resulting in very low brightness of the liquid crystal display panels, so brightness of screens of the liquid crystal display panels still needs to be improved. In addition, after adding reflective particles therein to increase their reflectivity, their color saturation cannot be guaranteed. Furthermore, development of reflective color photoresists is relatively difficult, and their color saturation, contrast, and brightness are all poor and need to be improved.

SUMMARY OF INVENTION

In order to solve the above problems, the technical solutions provided by this application are as follows:

An embodiment of the present application provides a reflective display panel, including a first substrate, a second substrate disposed opposite to the first substrate, and a liquid crystal layer disposed between the first substrate and the second substrate.

Wherein, a light-condensation layer is disposed between the second substrate and the liquid crystal layer, and a color-generating layer is disposed between the first substrate and the liquid crystal layer, and wherein the color-generating layer includes reflective electrodes and optical grating patterns formed on the reflective electrodes, and the optical grating patterns are configured to control a passage of light of different wavelengths.

According to a preferred embodiment of the present application, the optical grating patterns include light-shielding rods arranged at intervals, and a slit is formed between two adjacent light-shielding rods.

According to a preferred embodiment of the present application, each of the light-shielding rods includes a metal layer or a superimposed film layer composed of an inorganic layer and a metal layer. A material of the metal layer includes one of gold, silver, aluminum, copper, or chromium, or a combination thereof, and a material of the inorganic layer includes one of silicon nitride, silicon oxide, or a combination thereof.

According to a preferred embodiment of the present application, the light-shielding rod is a strip-shaped rectangular cuboid, and the rectangular cuboid is perpendicular to the reflective electrodes, wherein a height of the rectangular cuboid ranges from 50 nm to 500 nm, a width of the rectangular cuboid ranges from 20 nm to 200 nm, and a width of the slit ranges from 60 nm to 500 nm.

According to a preferred embodiment of the present application, the color-generating layer includes a red sub-color-generating layer, a green sub-color-generating layer, and a blue sub-color-generating layer, wherein the optical grating patterns corresponding to the red sub-color-generating layer, the green sub-color-generating layer, and the blue sub-color-generating layer have different shapes, and a light-shielding layer is disposed between any two adjacent sub-color-generating layers of the red sub-color-generating layer, the green sub-color-generating layer, and the blue sub-color-generating layer.

According to a preferred embodiment of the present application, the liquid crystal layer includes liquid crystal domains arranged in an array, the light-condensation layer includes convex lenses arranged in an array, and transparent electrodes are disposed between the convex lenses and the second substrate. The transparent electrodes, the convex lenses, the liquid crystal domains, and the sub-color-generating layers are aligned in a one-to-one correspondence.

According to a preferred embodiment of the present application, each of the convex lenses includes a flat portion and a convex portion, and the convex portion is configured to face one side of one of the sub-color-generating layers, the flat portion is attached to one of the transparent electrodes, and the convex portion has a circular arc structure.

According to a preferred embodiment of the present application, the transparent electrodes are indium tin oxide (ITO) electrodes.

According to a preferred embodiment of the present application, when the reflective display panel is in a turn-off state, the liquid crystal layer does not allow incident light to enter, and the incident light is emitted from a surface of the second substrate after the incident light is totally reflected at an interface between the convex lenses and the liquid crystal domains.

When the reflective display panel is in a turn-on state and a refractive index of the convex lenses is less than or equal to a refractive index of the liquid crystal domains, incident light directly directed to the color-generating layer; or when a refractive index of the convex lenses is greater than a refractive index of the liquid crystal domains, total reflection angles of the incident light at the interface between the convex lenses and the liquid crystal domains are defined as θ, part of the incident light with an incident angles less than θ is refracted and directed to the color-generating layer, another part of the incident light with an incident angles greater than θ or equal to θ is emitted from the surface of the second substrate after the incident light is totally reflected.

Wherein, the reflective electrodes and the transparent electrodes are configured to provide a required electric field for inversion of liquid crystals in the liquid crystal domains, and the transparent electrodes are also configured to adjust the total reflection angles of the incident light at the interface between the convex lenses and the liquid crystal domains.

According to a preferred embodiment of the present application, among the incident light passing through the liquid crystal layer, light rays perpendicular to a surface of the color-generating layer are allowed to pass through the liquid crystal domains, and light rays not perpendicular to the surface of the color-generating layer are absorbed by the liquid crystal domains.

According to a preferred embodiment of the present application, the first substrate is a thin film transistor substrate, and the second substrate is a transparent glass or a transparent plastic film.

According to a preferred embodiment of the present application, the thin film transistor array substrate includes a substrate, a buffer layer disposed on the substrate, a plurality of driving thin film transistors disposed on the buffer layer, and a planarization layer disposed on the plurality of driving thin film transistors. The planarization layer is provided with via holes, and the reflective electrodes of the color-generating layer are electrically connected to drains of the driving thin film transistors through the via holes.

Wherein, a source of one of the driving thin film transistors is connected to a positive of an external power supply, a corresponding driving chip is attached to a flexible printed circuit board, a negative of the external power supply transmits a corresponding electrical signal to a power wiring layer through a bonding area of the thin film transistor array substrate, and the power wiring layer transmits corresponding electrical signals to the transparent electrodes.

According to a preferred embodiment of the present application, the substrate is a superimposed film layer composed of yellow polyimide and transparent polyimide.

According to a preferred embodiment of the present application, a backlight structure is provided on a side of the second substrate away from the light-condensation layer.

According to a preferred embodiment of the present application, the backlight structure includes a light guide plate located on a surface of the second substrate and a first light source and a second light source located on both sides of the light guide plate, light rays emitted by the first light source and the second light source are directed toward the light-condensation layer after being redirected by the light guide plate.

According to a preferred embodiment of the present application, a material of the light-shielding layer includes an inorganic light-shielding material or a black matrix, and the inorganic light-shielding material includes acetophenone or fluorinated polyimide.

According to a preferred embodiment of the present application, the optical grating patterns are formed by nano-imprint technology.

According to a preferred embodiment of the present application, a material of the convex lenses includes silicon dioxide or polyimide.

According to a preferred embodiment of the present application, the reflective electrodes are composed of silver (Ag) alloy films.

According to a preferred embodiment of the present application, the liquid crystal domains are filled with polymer-dispersed liquid crystals.

Beneficial Effect

An embodiment of the present application provides a reflective display panel. The reflective display panel includes a first substrate, a color-generating layer and a light-shielding layer on the first substrate, a liquid crystal layer on the color-generating layer and the light-shielding layer, a light-condensation layer on the liquid crystal layer, and a second substrate on the light-condensation layer. The light-shielding layer is disposed in a gap between adjacent color-generating layers, and the color-generating layer includes an optical grating pattern on the reflective electrode to realize control of different light waves. Wherein, the principle of total reflection is utilized to allow the liquid crystal layer and the light-condensation layer to control whether the incident light enters the color-generating layer. When incident light is emitted from a light-condensation layer to a color-generating layer, the incident light passes through an optical grating pattern and produces monochromatic light of different colors due to scattering, interference, and diffraction effects. After being reflected by a reflective electrode, the monochromatic light passes through the optical grating pattern and then is emitted from a surface of the second substrate. A nano-imprint technology is utilized to form optical grating patterns with different shapes, heights, widths, period lengths, and space ratios to achieve control of different light waves, so that a structural color-generating layer generates different monochromatic lights. In addition, light emitted by each sub-color-generating layer is brighter and has greater color purity, thereby improving color display quality of a reflective display while reducing energy consumption of a display panel.

DESCRIPTION OF DRAWINGS

In order to explain the technical solutions in the embodiments and the prior art more clearly, the following will briefly introduce the drawings that need to be used in the description of the embodiments or in the prior art. Obviously, the drawings in the description are only some embodiments of the application. For those of ordinary skill in the art, other drawings can be obtained based on these drawings without creative work.

DETAILED DESCRIPTION OF PREFERRED EMBODIMENTS

Figure 1:
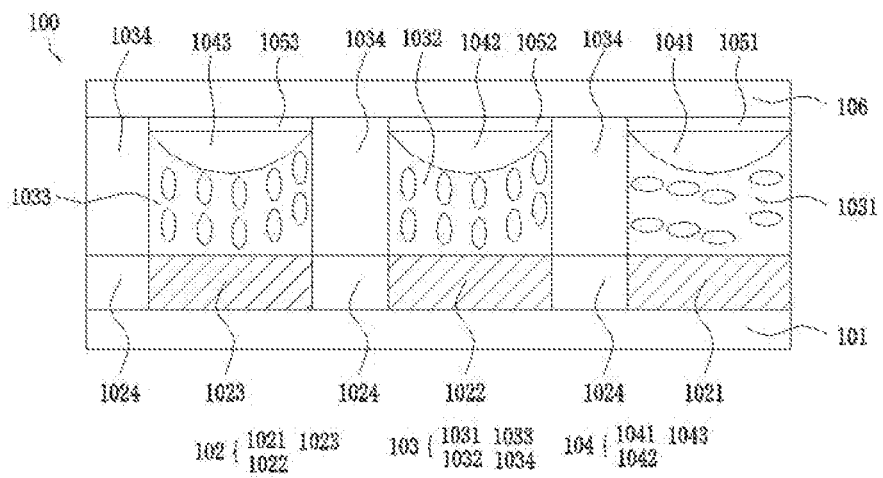
FIG. 1 is a schematic structural diagram of a film layer of a reflective display panel provided by this application.

The description of the following embodiments refers to the attached drawings to illustrate specific embodiments that can be implemented in the present application. The directional terms mentioned in this application, such as "above", "below", "front", "rear", "left", "right", "inside", "outside", "side", etc., only refer to directions with reference to the attached drawings. Therefore, the directional terms used are used to illustrate and understand the application, rather than to limit the application. In the figure, units with similar structures are indicated by the same reference numerals.

The present application directs to disadvantages of current reflective display panels that utilize reflective color photoresist or color photoresist with a reflective film layer to achieve colorization. Because the color photoresist itself has a high light absorption rate, ambient light needs to pass through a liquid crystal layer and a color photoresist twice. A loss of ambient light is high, resulting in very low brightness of liquid crystal display panels, so brightness of screens of the liquid crystal display panels still needs to be improved. In addition, after adding reflective particles to increase reflectivity, color saturations cannot be guaranteed. Furthermore, development of reflective color photoresists is relatively difficult, and their color saturation, contrast, and brightness are all poor and need to be improved. This embodiment can solve these disadvantages.

An embodiment of the present application provides a reflective display panel, which includes a first substrate, an opposing second substrate, and a liquid crystal layer disposed between the first substrate and the second substrate. Wherein, a light-condensation layer is disposed between the second substrate and the liquid crystal layer, and a color-generating layer is disposed between the first substrate and the liquid crystal layer, and wherein the color-generating layer includes reflective electrodes and optical grating patterns formed on the reflective electrodes, and the optical grating patterns are configured to control a passage of light of different wavelengths. The liquid crystal layer and the light-condensation layer in this application utilize the principle of total reflection to control whether incident light enters the color-generating layer. A nano-imprint technology is utilized to form optical grating patterns on the color-generating layer. Optical grating patterns are designed with different shapes, heights, widths, period lengths, and space ratios to realize control of different light waves so that the structural color-generating layer can generate different monochromatic light. When incident light passes through a corresponding optical grating pattern for the first time from a light-condensation layer to a color-generating layer, under effects of light scattering, interference, and diffraction, red light, green light, and blue light are generated, respectively. After the red light, green light, and blue light are reflected, they pass through the optical grating pattern again. Due to the effects of light scattering, interference, and diffraction, the emitted red light, green light, and blue light have greater brightness and purer colors. This increases the color saturation, contrast, and brightness of the emitted light, and further improves the display quality of the reflective display panel while reduces the energy consumption of the display panel.

Specifically, as shown in FIG. 1, the present application provides a schematic structural diagram of a film layer of a reflective display panel 100. The reflective display panel 100 includes a first substrate 101, a color-generating layer 102 and a light-shielding layer 1024 on the first substrate 101, a liquid crystal layer 103 on the color-generating layer 102 and the light-shielding layer 1024, a light-condensation layer 104 on the liquid crystal layer 103, and a second substrate 106 on the light-condensation layer 104. The first substrate 101 is a thin film transistor substrate, and the second substrate 106 is a transparent glass or a transparent plastic film.

The light-shielding layer 1024 is located in a gap between adjacent color-generating layers 102. The light-shielding layer 1024 is preferably an inorganic light-shielding material or a black matrix, and the inorganic light-shielding material is acetophenone or fluorinated polyimide. The color-generating layer 102 includes optical grating patterns formed on the reflective electrode. The optical grating patterns are used to realize the control of different light waves. The optical grating pattern includes light-shielding rods arranged at intervals, a slit is formed between two adjacent light-shielding rods, and the period length of the light-shielding rod and the slit ranges from 300 nm to 500 nm.

The light-shielding rod includes a metal layer or a superimposed film layer composed of an inorganic layer and a metal layer. A material of the metal layer includes one of gold, silver, aluminum, copper, or chromium, or a combination thereof, and a material of the inorganic layer includes one of silicon nitride, silicon oxide, or a combination thereof. The light-shielding rod is a strip-shaped rectangular cuboid, and the rectangular cuboid is preferably perpendicular to the reflective electrodes. Wherein, a height of the rectangular cuboid ranges from 50 nm to 500 nm, a width of the rectangular cuboid ranges from 20 nm to 200 nm, and a width of the slit ranges from 60 nm to 500 nm. In this embodiment, the light-condensation layer 104 is preferably a prism layer, and the light-condensation layer 104 preferably receives ambient light. When the reflective display panel 100 is in a turn-on state, there is no need for a corresponding backlight source to provide a light source, and the use of ambient light can greatly reduce the power consumption of the reflective display panel 100.

The color-generating layer 102 includes at least a red sub-color-generating layer 1021, a green sub-color-generating layer 1022, and a blue sub-color-generating layer 1023, and may also include sub-color-generating layers of other colors. Wherein, the optical grating patterns corresponding to the red sub-color-generating layer 1021, the green sub-color-generating layer 1022, and the blue sub-color-generating layer 1023 have different shapes and/or sizes. In this embodiment, the shapes of the optical grating patterns corresponding to the red sub-color-generating layer 1021, the green sub-color-generating layer 1022, and the blue sub-color-generating layer 1023 are the same. By adjusting the size of the optical grating pattern, such as setting the heights and widths of the light-shielding rods to be different, setting the widths of the slits to be different, and so on, different light wave control can be achieved. In this way, it is convenient to use the same photomask and the same photolithography process to prepare optical grating patterns.

The red sub-color-generating layer 1021 can reflect red light and convert green and blue light into red light. The green sub-color-generating layer 1022 can reflect green light and convert red and blue light into green light. The blue sub-color-generating layer 1023 can reflect blue light and convert red and green light into blue light. Three kinds of monochromatic light rays are intertwined to form color images of various color gamut. Because the incident light is a natural light, after passing through the corresponding optical grating pattern for the first time, red light, green light, and blue light are generated under the effects of light scattering, interference, and diffraction effects, respectively. After being reflected, the red, green, and blue light pass through the optical grating pattern for the second time, and again due to the light scattering, interference, and diffraction effects, the emitted red, green, and blue light have greater brightness and purer color, and the display quality of the reflective display panel is further improved.

Wherein, the height of the light-shielding rod of the optical grating pattern of the red sub-color-generating layer 1021 preferably ranges from 50 nm to 100 nm. The ratio of the width of the light-shielding rod to the width of the slit is preferably 0.5. The period length of the grating ranges from 300 nm to 400 nm. The height of the light-shielding rod of the optical grating pattern of the green sub-color-generating layer 1022 and the line width of the slit both range from 150 nm to 300 nm. The period length of the grating ranges from 300 nm to 500 nm, the line width of the optical grating pattern of the blue sub-color-generating layer 1023 and the width of the slit both range from 80 nm to 300 nm, and the period length of the grating ranges from 300 nm to 500 nm. The numerical values of the optical grating pattern of the color-generating layer 102 are all preferred values and not limited to the above-mentioned parameters. The three primary colors of red, green, and blue can be obtained as long as the shape and size of the optical grating pattern are reasonably controlled. The specific size is not limited here, because the size of the grating is affected by the size and shape of the pixels in the display panel. In addition, the structures of the gratings of different colors are related to the shape of the light-shielding rods of the grating, the arrangement period, and the slit pitch. The size of any changes, the other sizes also change. It is difficult to give a specific size.

The display principle of the reflective display panel is: After the ambient light passes through the color-generating layer 102 for the first time, the color-generating layer 102 selectively emits monochromatic light due to the scattering, interference, and diffraction effects of the ambient light, and changes the wavelength of the incident light to achieve the purpose of light splitting. The monochromatic light passes through the color-generating layer 102 again after being reflected by the reflective electrode. The color-generating layer emits monochromatic light with higher brightness, and then the monochromatic light is emitted from the surface of the second substrate. It achieves the function of enhancing the brightness of the monochromatic light. The monochromatic light is generally three primary monochromatic lights of red, green, and blue. Human eyes recognize colors based on the wavelength of the light they see. Most of the colors in the visible spectrum can be formed by mixing three basic monochromatic lights in different proportions. Therefore, by reasonably setting the shape and size of the optical grating pattern in the color-generating layer 102, the light output ratio of the three primary monochromatic lights of red, green, and blue can be well controlled, and after reaching a certain intensity, the three monochromatic lights are mixed in a certain ratio to obtain various colored lights to achieve color display, even white or black display. This greatly reduces power consumption of the display panel. Under a condition of sufficient light, ambient light is provided as incident light, and in a case of dim or no light, an incident light can also be provided by an external light source.

Figure 2:
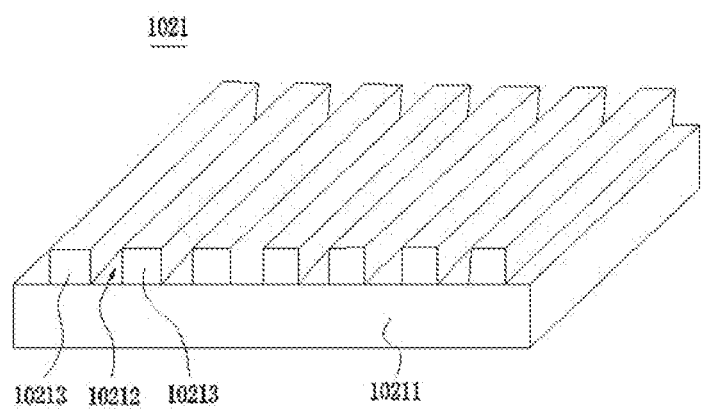
FIG. 2 is a schematic diagram of a three-dimensional structure of an optical grating pattern of the reflective display panel provided by this application.
Figure 3:
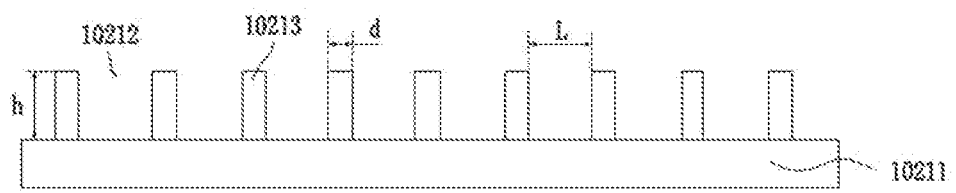
FIG. 3 is a schematic structural diagram of a cross-section of the optical grating pattern of the reflective display panel provided by this application.

As shown in FIG. 2 and FIG. 3, the present application provides a schematic structural diagram of the red sub-color-generating layer 1021 of the reflective display panel 100, wherein FIG. 2 is a perspective view, and FIG. 3 is a cross-sectional view. The red sub-color-generating layer 1021 includes a reflective electrode 10211 and a light-shielding rod 10213 on the reflective electrode 10211. The slit 10212 is formed between two adjacent light-shielding rods 10213. The reflective electrode 10211 is preferably a silver (Ag) alloy film. The height of the light-shielding rod 10213 is defined as h, the width of the light-shielding rod 10213 is defined as d, and the width of the slit is defined as L. The h preferably ranges from 50 nm to 500 nm, the d preferably ranges from 20 nm to 200 nm, and the L preferably ranges from 60 nm to 500 nm. The cross-section of the light-shielding rod 10213 of this embodiment is preferably rectangular.

Figure 4:
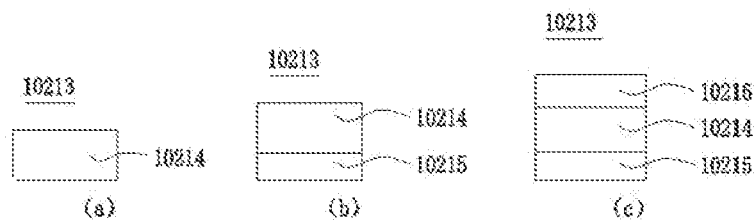
FIG. 4 is a schematic structural diagram of a light-shielding rod film layer provided with the optical grating pattern in this application.

As shown in FIG. 4 (*a*), the light-shielding rod 10213 includes a metal layer 10214. As shown in FIG. 4 (*b*), the light-shielding rod 10213 includes a metal layer 10214 and a first inorganic layer 10215 located on a side of the metal layer 10214. As shown in FIG. 4 (*c*), the light-shielding rod 10213 includes a metal layer 10214, a first inorganic layer 10215, and a second inorganic layer 10216 located on both sides of the metal layer 10214. The material of the metal layer 10214 is at least one of gold, silver, aluminum, copper, or chromium. The materials of the first inorganic layer 10215 and the second inorganic layer 10216 are silicon nitride or silicon oxide or a combination thereof.

As shown in FIG. 1, the liquid crystal layer 103 includes liquid crystal domains arranged in an array, and a sealant 1034 is disposed between two adjacent liquid crystal domains. For example, a sealant 1034 is disposed between any two of a liquid crystal domain 1031, a liquid crystal domain 1032, and a liquid crystal domain 1033. The light-condensation layer 104 includes convex lenses arranged in an array, such as convex lens 1041, convex lens 1042, and convex lens 1043. The material of the convex lens is silicon dioxide or polyimide. Transparent electrodes, such as transparent electrode 1051, transparent electrode 1052, and transparent electrode 1053, are arranged between the light-condensation layer 104 and the second substrate 106. The transparent electrode is preferably an indium tin oxide (ITO) electrode. The transparent electrode 1051, the convex lens 1041, the liquid crystal domain 1031, and the red sub-color-generating layer 1021 are aligned in a one-to-one correspondence. The structures above the green sub-color-generating layer 1022 and the blue sub-color-generating layer 1023 are similar to the structure above the red sub-color-generating layer 1021, and will not be repeated here. Wherein, the convex lens includes a flat portion and a convex portion, the convex portion is configured to face a side of the sub-color-generating layer, the flat portion is attached to the transparent electrode, and the convex portion has a circular arc structure. For example, a side of the convex lens 1041 facing the red sub-color-generating layer 1021 is a convex portion, and a side attached to the transparent electrode 1051 is a flat portion.

Figure 5:
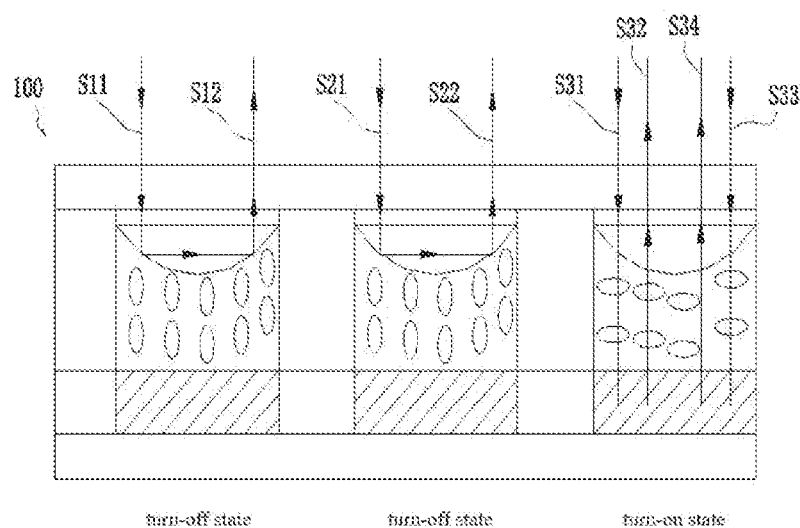
FIG. 5 is a schematic diagram of a light propagation path in the reflective display panel provided by this application.

As shown in FIG. 5, the present application provides a schematic diagram of light propagation in a reflective display panel. In this embodiment, a part of the reflective display panel is in a dark (turn-off) state, and another part is in a turn-on state, which is only a schematic diagram of light propagation. It should be particularly noted that when the reflective display panel is in the dark state, all the liquid crystal domains on the display panel are preferably in the dark state, and when the reflective display panel is in the turn-on state, all the liquid crystal domains on the display panel are in the turn-on state, except for the liquid crystal domains used for other purposes, such as the liquid crystal domain in the camera area under the screen.

Please refer to FIG. 5 together with FIG. 1. When the reflective display panel 100 of this embodiment is in the dark state, the liquid crystal layer 103 does not allow incident light to enter, and the incident light is emitted from a surface of the second substrate after the incident light is totally reflected at the interface between the prism layer and the liquid crystal domains. For example, the liquid crystal domain 1033 and the liquid crystal domain 1032 are in a state that does not allow light to pass through. The light ray S11 is totally reflected by the convex lens 1043, and the light ray S12 is emitted from the convex lens 1043. The light ray S21 is totally reflected by the convex lens 1042, and the light ray S22 is emitted from the convex lens 1042.

When the reflective display panel 100 is in a turn-on state and a refractive index of the convex lenses is less than or equal to a refractive index of the liquid crystal domains, incident light is directly directed to the color-generating layer 102. For example, the liquid crystal domain 1031 is in a state that allows light rays to pass through, and the light ray S31 and the light ray S33 pass straight through the convex lens 1041 and the liquid crystal domain 1031. After scattering, interference, and diffraction effects occur, the light ray S32 and the light ray S34 are linearly emitted from the second substrate 106. When a refractive index of the convex lenses is greater than a refractive index of the liquid crystal domains, total reflection angles of the incident light at the interface between the convex lenses and the liquid crystal domains are defined as θ, part of the incident light with incident angles less than θ is refracted and directed to the color-generating layer, and another part of the incident light with incident angles greater than θ or equal to θ is emitted from the surface of the second substrate 106 after the incident light is totally reflected (the specific light rays are not shown in the figure).

The reflective electrode 10211 and the transparent electrode are used to provide the required electric field for the liquid crystal in the liquid crystal layer 103 to flip. The transparent electrode is further used to adjust the total reflection angles of the interface between the convex lens and the liquid crystal domain. For example, the transparent electrode 1051 is further used to adjust the total reflection angles θ of the interface between the convex lens 1041 and the liquid crystal domain 1031. For example, the voltage of the transparent electrode 1051 affects the total reflection angle θ. This principle and fact have been published in related papers.

In another embodiment, among the incident light passing through the liquid crystal layer 103, the light rays perpendicular to the surface of the color-generating layer 102 is allowed to pass through the liquid crystal domains, and the light rays not perpendicular to the surface of the color-generating layer 102 is absorbed by the liquid crystal domains. Because the light rays that are all perpendicular to the optical grating pattern improve the uniformity of the incident light, after the diffraction occurs, a more pure and consistent direction of the emitted light can be obtained, and the display quality of the reflective display panel 100 can be improved. The liquid crystal domains of this embodiment are filled with polymer-dispersed liquid crystals.

Figure 6:
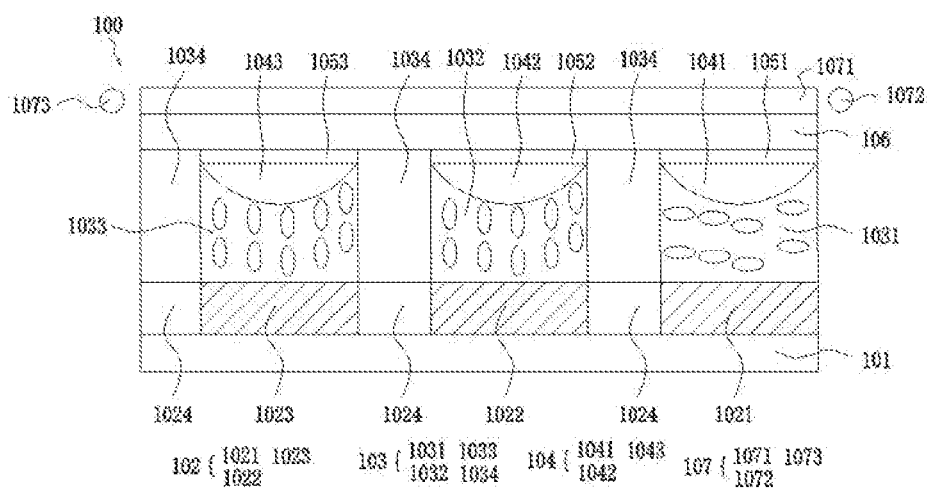
FIG. 6 is a schematic structural diagram of another type of film layer of the reflective display panel provided by this application.

As shown in FIG. 6, the present application provides a schematic diagram of another film layer structure of the reflective display panel 100. A backlight structure 107 is disposed on a side of the second substrate 106 away from the light-condensation layer 104. The backlight structure 107 includes a light guide plate 1071 and a first light source 1072 and a second light source 1073 located on both sides of the light guide plate 1071. The light rays emitted by the first light source 1072 and the second light source 1073 are directed toward the light-condensation layer 104 after being redirected by the light guide plate 1071. After the light rays are scattered, interfered, and diffracted in the color-generating layer 102, they are again vertically emitted from the back of the liquid crystal layer 103, the light-condensation layer 104, the transparent electrode, the second substrate 106, and the light guide plate 1071. The other structures are similar to those in FIG. 1, and will not be repeated here.

The first substrate 101 in this embodiment is preferably a thin film transistor substrate, and can also be a driving circuit layer without thin film transistors. The thin film transistor array substrate includes a substrate, a buffer layer disposed on the substrate, a plurality of driving thin film transistors disposed on the buffer layer, and a planarization layer disposed on the plurality of driving thin film transistors. The planarization layer is provided with via holes, and the substrate is preferably a superimposed film layer of a yellow polyimide layer and a transparent polyimide layer. The reflective electrode in the color-generating layer 102 is electrically connected to the drain of the driving thin film transistor through a via hole. The source of the driving thin film transistor is connected to the positive of an external power supply. A corresponding driving chip is attached to a flexible printed circuit board, a negative of the external power supply transmits a corresponding electrical signal to a power wiring layer through the bonding area of the thin film transistor array substrate, and the power wiring layer transmits corresponding electrical signals to the transparent electrodes, so as to realize the normal deflection of the liquid crystals of the liquid crystal layer 103.

According to the above-mentioned reflective display panel, the present application further provides a manufacturing method of a reflective display panel, including:

Step S10, a first substrate is provided, and a reflective electrode and an optical grating pattern are sequentially formed on the first substrate to form a color-generating layer. An inorganic layer and a metal film layer are sequentially formed on the reflective electrode, and a nano-grating structure pattern is constructed on the inorganic layer and the metal film layer by a nano-imprint method.

Step S20, a liquid crystal layer, a light-condensation layer, and a transparent electrode layer are sequentially formed on the color-generating layer, and a second substrate is provided to complete the manufacturing of the reflective display panel.

The embodiment of the present application provides a reflective display panel. The reflective display panel includes a first substrate, a color-generating layer and a light-shielding layer on the first substrate, a liquid crystal layer on the color-generating layer and the light-shielding layer, a light-condensation layer on the liquid crystal layer, and a second substrate on the light-condensation layer. The light-shielding layer is located in a gap between adjacent sub-color-generating layers, and the color-generating layer includes a reflective electrode and an optical grating pattern on the reflective electrode. The optical grating pattern is used to realize control of different light waves. Wherein, the liquid crystal layer and the light-condensation layer utilize a principle of total reflection to control whether incident light enters the color-generating layer. When incident light is directed from a light-condensation layer to a color-generating layer and passes through the optical grating pattern, different colors of monochromatic light are generated due to scattering, interference, and diffraction effects. After being reflected by a reflective electrode, the monochromatic light passes through the optical grating pattern, and then is emitted from a surface of the second substrate. This application utilizes nano-imprint technology to form optical grating patterns with different shapes, heights, widths, period lengths, and space ratios to achieve control of different light waves, so that a structural color-generating layer generates different monochromatic lights. In addition, the light emitted by each sub-color-generating layer is brighter and has greater color purity, thereby improving the color display quality of the reflective display while reducing the energy consumption of the display panel.

As described above, although this application has been disclosed above in preferred embodiments, the preferred embodiments are not intended to limit this application. Those of ordinary skill in the art can make various changes and modifications without departing from the spirit and scope of this application. Therefore, the protection scope of this application is subject to the scope defined by the claims.

What is claimed is:

1. A reflective display panel, comprising a first substrate, an opposing second substrate, and a liquid crystal layer disposed between the first substrate and the second substrate:
   wherein a light-condensation layer is disposed between the second substrate and the liquid crystal layer, and a color-generating layer is disposed between the first substrate and the liquid crystal layer, and wherein the color-generating layer comprises reflective electrodes and optical grating patterns formed on the reflective electrodes, and the optical grating patterns are configured to control a passage of light of different wavelengths,
   wherein the optical grating patterns comprise light-shielding rods arranged at intervals,
   wherein each of the light-shielding rods comprises a metal layer, and a first inorganic layer and a second inorganic layer, wherein the metal layer, the first inorganic layer and the second inorganic layer are stacked, and the metal layer is disposed on an upper surface of the first inorganic layer, the second inorganic layer is disposed on an upper surface of the metal layer,
   wherein the liquid crystal layer comprises liquid crystal domains arranged in an array, and a sealant is disposed between two adjacent liquid crystal domains.

2. The reflective display panel according to claim 1, wherein a material of the metal layer comprises at least one of gold, silver, aluminum, copper, or chromium, or a combination thereof, and a material of the inorganic layer comprises one of silicon nitride, silicon oxide, or a combination thereof.

3. The reflective display panel according to claim 1, wherein each of the light-shielding rods is a strip-shaped rectangular cuboid, and the rectangular cuboid is perpendicular to the reflective electrodes; and
   wherein a height of the rectangular cuboid ranges from 50 nm to 500 nm, a width of the rectangular cuboid ranges from 20 nm to 200 nm, and a width of the slit ranges from 60 nm to 500 nm.

4. The reflective display panel according to claim 1, wherein the color-generating layer comprises sub-color-generating layers of a red sub-color-generating layer, a green sub-color-generating layer, and a blue sub-color-generating layer; and
   wherein the optical grating patterns corresponding to the red sub-color-generating layer, the green sub-color-generating layer, and the blue sub-color-generating layer have different shapes, and a light-shielding layer is disposed between any two adjacent sub-color-generating layers of the red sub-color-generating layer, the green sub-color-generating layer, and the blue sub-color-generating layer.

5. The reflective display panel according to claim 4, wherein the light-condensation layer comprises convex lenses arranged in an array, transparent electrodes are disposed between the convex lenses and the second substrate, and the transparent electrodes, the convex lenses, the liquid crystal domains, and the sub-color-generating layers are aligned in a one-to-one correspondence.

6. The reflective display panel according to claim 5, wherein each of the convex lenses comprises a flat portion and a convex portion, and the convex portion is configured to face one side of one of the sub-color-generating layers, the flat portion is attached to one of the transparent electrodes, and the convex portion has a circular arc structure.

7. The reflective display panel according to claim 5, wherein the transparent electrodes are indium tin oxide (ITO) electrodes.

8. The reflective display panel according to claim 5, wherein when the reflective display panel is in a turn-off state, the liquid crystal layer does not allow incident light to enter, and the incident light is emitted from a surface of the second substrate after the incident light is totally reflected at an interface between the convex lenses and the liquid crystal domains;
   wherein when the reflective display panel is in a turn-on state and a refractive index of the convex lenses is less than or equal to a refractive index of the liquid crystal domains, the incident light is directly directed to the color-generating layer; or when the refractive index of the convex lenses is greater than the refractive index of the liquid crystal domains, a total reflection angle of the incident light at the interface between the convex lenses and the liquid crystal domains is defined as $\theta$, part of the incident light with incident angles less than $\theta$ is refracted and directed to the color-generating layer, another part of the incident light with incident angles greater than $\theta$ or equal to $\theta$ is emitted from the surface of the second substrate after the incident light is totally reflected; and
   wherein the reflective electrodes and the transparent electrodes are configured to provide a electric field for inversion of liquid crystals in the liquid crystal domains, and the transparent electrodes are also configured to adjust the total reflection angles of the incident light at the interface between the convex lenses and the liquid crystal domains.

9. The reflective display panel according to claim 8, wherein among the incident light passing through the liquid crystal layer, light rays perpendicular to a surface of the color-generating layer are allowed to pass through the liquid crystal domains, and light rays not perpendicular to the surface of the color-generating layer are absorbed by the liquid crystal domains.

10. The reflective display panel according to claim 9, wherein the liquid crystal domains are filled with polymer-dispersed liquid crystals.

11. The reflective display panel according to claim 5, wherein a material of the convex lenses comprises silicon dioxide or polyimide.

12. The reflective display panel according to claim 4, wherein a material of the light-shielding layer comprises an inorganic light-shielding material or a black matrix, and the inorganic light-shielding material comprises acetophenone or fluorinated polyimide.

13. The reflective display panel according to claim 1, wherein the first substrate is a thin film transistor substrate, and the second substrate is a transparent glass or a transparent plastic film.

14. The reflective display panel according to claim 13, wherein the thin film transistor substrate comprises a substrate, a buffer layer disposed on the substrate, a plurality of driving thin film transistors disposed on the buffer layer, and a planarization layer disposed on the plurality of driving thin film transistors, the planarization layer is provided with via holes, and the reflective electrodes of the color-generating layer are electrically connected to drains of the driving thin film transistors through the via holes; and wherein a source of one of the driving thin film transistors is connected to a positive of an external power supply, a corresponding driving chip is attached to a flexible printed circuit board, a negative of the external power supply transmits a corresponding electrical signal to a power wiring layer through a bonding area of the thin film transistor substrate, and the power wiring layer transmits corresponding electrical signals to transparent electrodes.

15. The reflective display panel according to claim 14, wherein the substrate is a superimposed film layer composed of yellow polyimide and transparent polyimide.

16. The reflective display panel according to claim 13, wherein the backlight structure comprises a light guide plate located on a surface of the second substrate and a first light source and a second light source located on either sides of the light guide plate, and light rays emitted by the first light source and the second light source are directed toward the light-condensation layer after being redirected by the light guide plate.

17. The reflective display panel according to claim 1, wherein a backlight structure is disposed on a side of the second substrate away from the light-condensation layer.

18. The reflective display panel according to claim 1, wherein the optical grating patterns are formed by nano-imprint technology.

19. The reflective display panel according to claim 1, wherein the reflective electrodes are composed of silver (Ag) alloy films.

* * * * *